(12) United States Patent
Orlik et al.

(10) Patent No.: US 7,796,630 B2
(45) Date of Patent: Sep. 14, 2010

(54) METHOD FOR ESTIMATING CHANNELS IN TWO-HOP MIMO AF NETWORKS

(75) Inventors: Philip V. Orlik, Cambridge, MA (US); Jun Ma, Atlanta, GA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 39 days.

(21) Appl. No.: 12/366,029

(22) Filed: Feb. 5, 2009

(65) Prior Publication Data

US 2010/0195751 A1  Aug. 5, 2010

(51) Int. Cl.
*H04Q 11/02* (2006.01)
(52) U.S. Cl. ............... 370/430; 370/315; 370/226; 370/274; 370/279; 375/267; 375/211
(58) Field of Classification Search ........ 370/315, 370/226, 274, 279; 375/267, 211
See application file for complete search history.

(56) References Cited

U.S. PATENT DOCUMENTS

| | | | |
|---|---|---|---|
| 7,525,939 B2 * | 4/2009 | Abe et al. ............ | 370/328 |
| 2007/0129008 A1 * | 6/2007 | Shi et al. ............. | 455/11.1 |
| 2007/0217537 A1 * | 9/2007 | Berenguer et al. ..... | 375/267 |
| 2008/0002601 A1 * | 1/2008 | Coronel et al. ........ | 370/315 |
| 2008/0049658 A1 * | 2/2008 | Asai et al. ........... | 370/315 |
| 2008/0266176 A1 * | 10/2008 | Nabar et al. .......... | 342/373 |
| 2008/0304555 A1 * | 12/2008 | Larsson .............. | 375/211 |
| 2009/0190634 A1 * | 7/2009 | Bauch et al. .......... | 375/211 |
| 2009/0268657 A1 * | 10/2009 | Alexiou et al. ........ | 370/315 |
| 2009/0296626 A1 * | 12/2009 | Hottinen et al. ....... | 370/315 |

\* cited by examiner

*Primary Examiner*—Ayaz R Sheikh
*Assistant Examiner*—Andrew C Lee
(74) *Attorney, Agent, or Firm*—Dirk Brinkman; Gene Vinokur

(57) ABSTRACT

A method estimates interim channels in a two-hop multi-input-multi-output (MIMO) amplify-and-forward (AF) relay network including a source station (SS), a relay station (RS), and a destination station (DS). The estimate is according to the overall channel obtained at the DS or the SS. By varying an amplifying matrix of the RS over time, the method establishes a linear equation group with respect to the elements of the interim channels over the first (SS-RS) and second (RS-SS) hops, based on which low-complexity estimation of the interim channels is performed.

14 Claims, 4 Drawing Sheets

100

METHOD FOR ESTIMATING CHANNELS IN TWO-HOP MIMO AF NETWORKS

FIELD OF THE INVENTION

This invention relates generally to cooperative communication in relay networks, and more particularly to estimating channels in two-hop multi-input-multi-output (MIMO) amplify-and-forward (AF) networks.

BACKGROUND OF THE INVENTION

Cooperative communication is regarded as one important technique in next generation wireless communication networks. A minimal single-user cooperative communication network includes a source station (SS), a relay station (RS), and a destination station (DS). As a repeater, the RS receives signals transmitted by the SS, performs appropriate signal processing, and then relays the signals to the DS. Relay techniques can increase the coverage, decrease overall transmit power, and improve reliability of the communication links with the help of multiple independent paths under multi-rely case.

Relaying modes can be broadly categorized as decode-and-forward (DF) and amplify-and forward (AF). In the DF mode, the RS demodulates the received signals, decodes the encoded data in the signals, re-encodes and re-modulates the data, and forwards the signal to the DS. In the AF mode, the RS only amplifies and forwards the received signals without decoding. Thus, the AF mode is simpler to implementation than the DF mode, and hence provides a tradeoff between performance and complexity.

In a relay-based two-hop cooperative communication network, the SS and the RS can concurrently transmit signals using the same channel, i.e., frequency subcarrier band, while the signals are detected jointly by the DS. Alternatively, the signals are transmitted using two orthogonal channels by means of time-division or frequency-division to avoid interference. In either case, cooperative diversity can be achieved by allowing the DS to concurrently receive signals from both the SS and RS.

In a scattering environment, multi-path fading varies significantly on the scale of half a wavelength. Multi-input-multi-output (MIMO) techniques use multiple antennas at both the transmitter and receiver to take advantage of the inherent spatial diversity in wireless channels. MIMO techniques are widely used to enhance the spectrum efficiency and reliability of wireless communication networks. It is desired to combine relay and MIMO techniques.

In a two-hop AF relay MIMO network, the overall channel from the SS to the DS is a combination of two interim channels. The first interim channel is from the SS to the RS, and the second interim channel is from the RS to the DS.

Conventionally, the overall channel form the SS to the DS can only be estimated directly by using pilot signals that are transmitted from the SS to the DS. However, in a typical two-hop MIMO AF relay network with simple relay nodes, the RS does not explicitly decode and retransmit pilot signals to the DS, because the RS only amplifies and forwards. As a result, the interim channels cannot be estimated directly by the DS based on pilot signals. However, the performance of the two-hop MIMO AF relay network can be significantly improved if channel state information (CSI) would be available for the interim channels. Then, the transmitters select the optimal antennas to maximize throughput and reduce errors.

Therefore, it is desired to provide a low-complexity method that estimates the CSI for the interim channels at a DS in a two-hop MIMO AF relay network without using pilot signals.

SUMMARY OF THE INVENTION

The object of the present invention is to estimate channel state information (CSI) for channels in a two-hop multi-input- multi-output (MIMO) amplify-and-forward (AF) relay network without explicitly using pilot signals. The network includes a source station (SS), a relay station (RS), and a destination station (DS). The channels include a first interim channel from the SS to the RS, a second interim channel from the RS to the DS, and an overall channel from the SS to the DS. The channels are estimated at the DS.

By varying a power amplifying matrix P at the relay station (RS) during several consecutive time intervals as signals are transmitted from a source station (SS) to a destination station (DS), different CSI for the overall channel that includes the interim channels can be estimated at the DS.

These estimated CSI are initially in a form of a set of non-linear equations. The non-linear equations are transformed to a single linear equation. Then, the linear equation is solved to yield the channel estimates. The channel estimates can be used by transmitters at the SS and the RS to optimally select antennas.

DETAILED DESCRIPTION OF THE PREFERRED EMBODIMENTS

Figure 1:
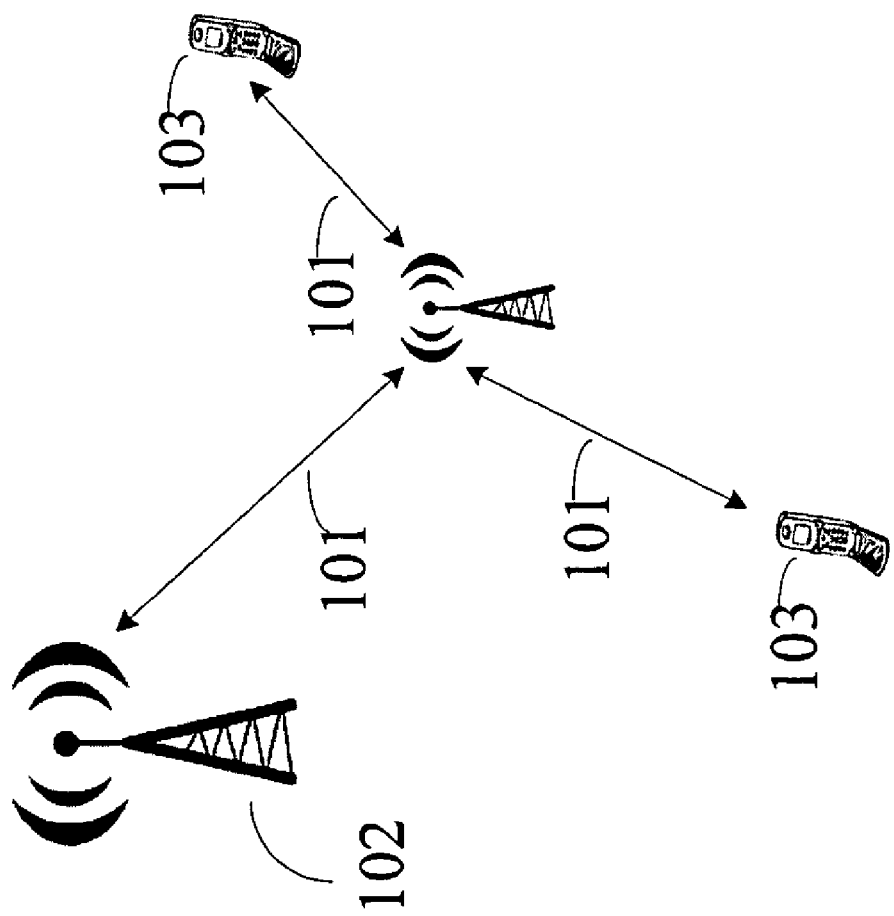
FIG. 1 is a schematic of a two-hop multi-input multi-output amplify-and-forward relay network operating according to the embodiments of the invention.

FIG. 1 shows a two-hop multi-input multi-output (MIMO) amplify-and-forward (AF) relay network 100 operating according to embodiments of our invention. The wireless network can be a local area network (LAN), a metropolitan area network (MAN), or in a cellular network. The network includes a base station (BS) 101, a relay station (RS), and a mobile station (MS). It should be understood that there could be multiple RS and MS. The BS is stationary, the RSs can be fixed, move occasionally (nomadic), or mobile. The MS typically is mobile. Depending on the direction of communication, the BS or the MS can either be a source station (SS) 201 or a destination station (DS) 203, see FIG. 2.

In this network, there is an overall channel 110, a first interim channel 111 from the SS to the RS, and a second interim channel from the RS to the DS. Because the AF RS does not transmit pilot signals that could be used for channel estimation, the interim channels 111-112 are estimated from the overall channel 110.

Figure 2:
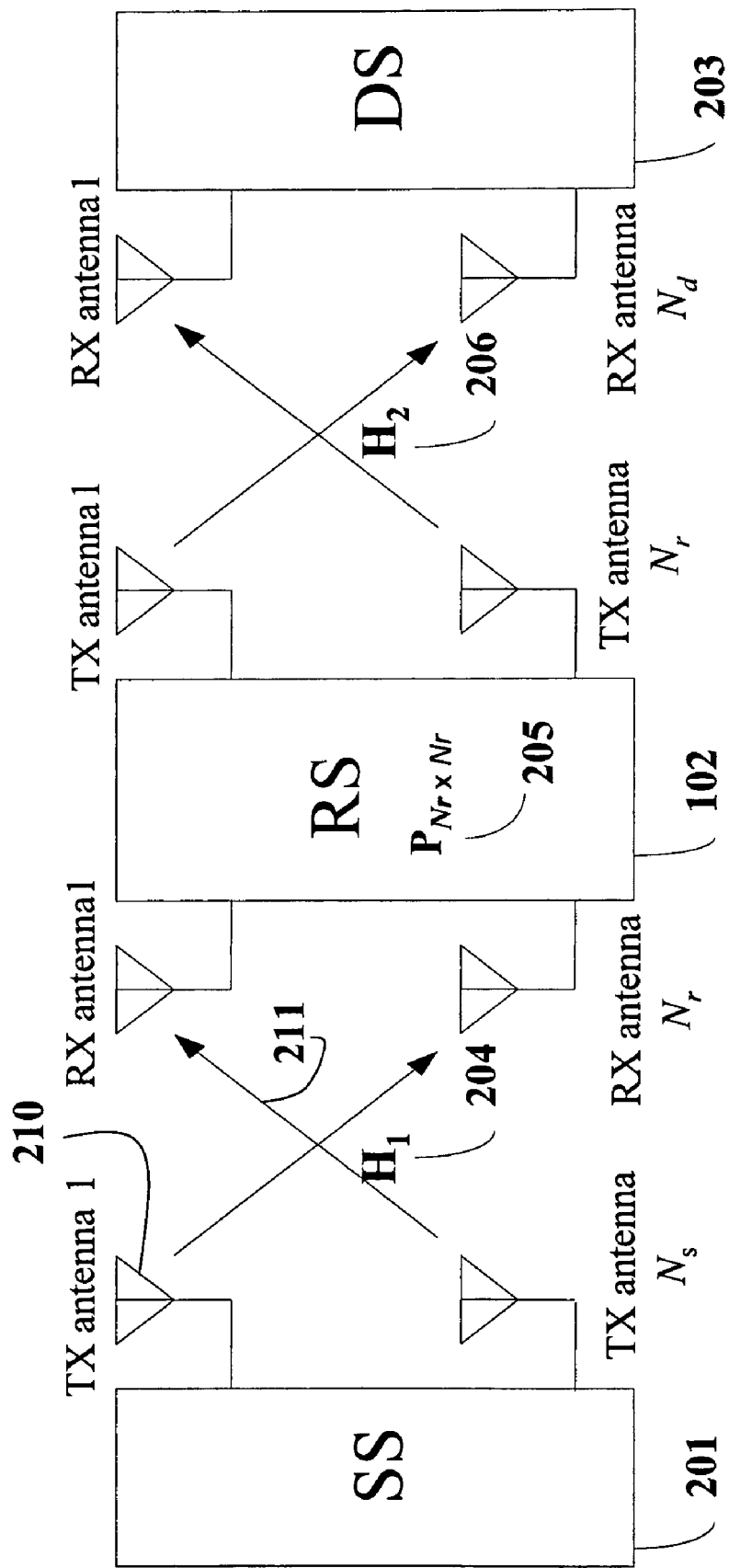
FIG. 2 is a block diagram of the network of FIG. 1 including wireless channels according to embodiments of the invention.

FIG. 2 shows the network of FIG. 1 as well as the channels 210 between the various transmit (TX) and receive (RX) antennas 211. There are $N_s$ transmit antennas at the SS 201, $N_r$ receive and transmit antenna pairs at the relay station (RS)

102, and $N_d$ receive antennas at the DS 203. Data between the SS and DS are communicated via the RS, using two orthogonal interim channels, one interim channel from the source to relay (SS-RS), and the other from the RS to the DS. The transmitters can use time-division multiplexing, frequency-division multiplexing, or code-division multiple access.

A $N_r \times N_s$ non-singular channel matrix for the channel 111 between the SS and the RS is $H_1$ 204. An invertible $N_r \times N_r$ power amplifying matrix at the RS is P 205, and a $N_d \times N_r$ non-singular channel matrix for the channel 112 between the RS and the DS is $H_2$. Both matrices $H_1$ and $H_2$ denote flat fading channels on a narrow spectrum band, such as an orthogonal frequency division multiplexing (OFDM) subcarrier. The $N_d \times N_s$ channel matrix for the overall channel 110 between the SS and the DS is $$H_O = H_2 P H_1 \qquad (1)$$

we estimate the interim channels, $\alpha H_1$ and $$\frac{H_2}{\alpha}$$

using observations of the overall channel 110, where $\alpha$ is an arbitrary complex number. These estimates are obtained from knowledge of the amplifying matrix P 205, and the corresponding estimated overall channel $H_{EO}$. Then, we can determine the channel matrices $H_1$ and $H_2$.

Estimation of $H_1$ and $H_2$ When $N_r = \min\{N_s, N_d\}$

Figure 3:
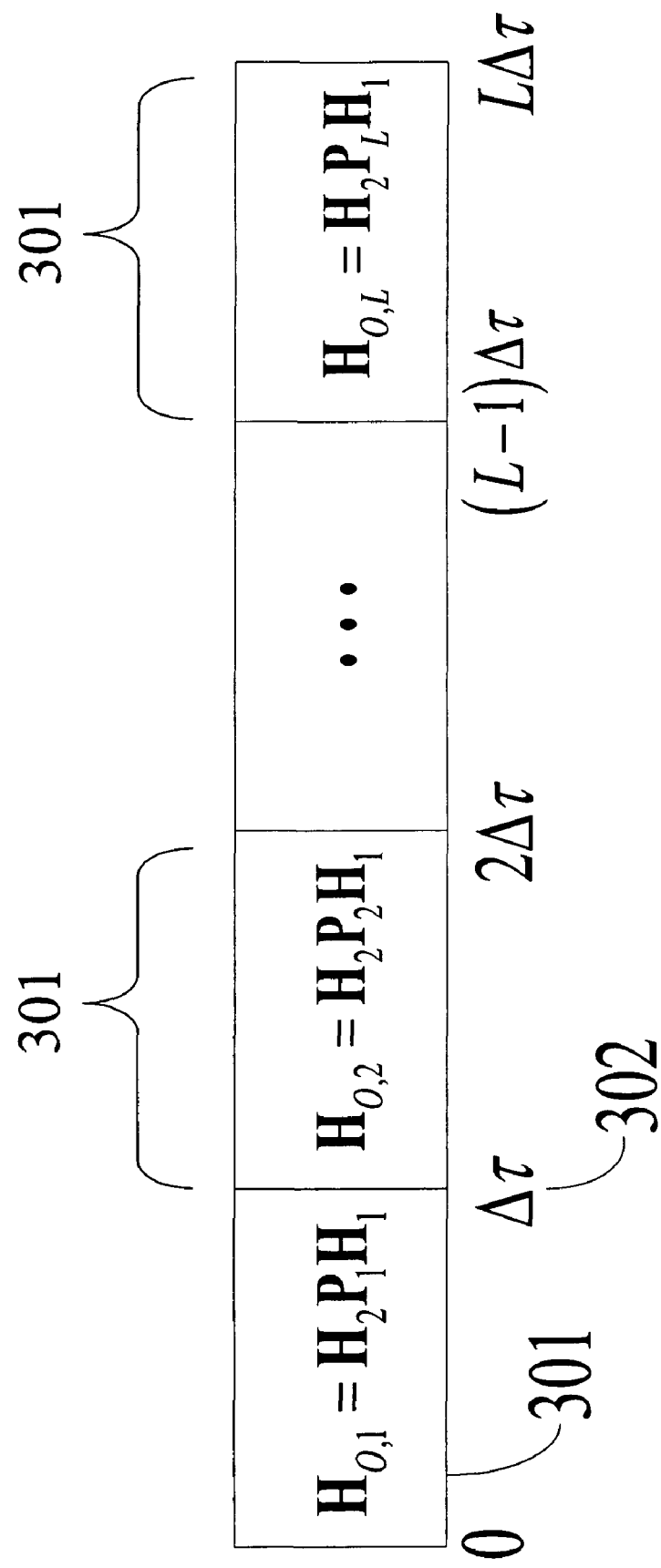
FIG. 3 is a timing diagram of channel estimation for interim channels according to embodiments of the invention.

FIG. 3 schematically shows the timing for estimating the interim channels of our two-hop MIMO AF relay network. Here, the number of antennas $N_r$ at the RS is $\min\{N_s, N_d\}$.

The fundamental idea of our invention is to vary the amplifying matrices $P_L$ 205 during consecutive time intervals 301 as signals are relayed so that multiple matrix equations, with respect to $H_1$ and $H_2$ can be obtained. The multiple equations are used to determine $\alpha H_1$ and $$\frac{H_2}{\alpha}.$$

That is, the RS changes the amplifying matrix P in a predetermined manner over time while receiving and transmitting signals so that the DS can detect a sequence of overall channels $H_{EO}$, each of which can be used to determine the interim channels $H_1$ and $H_2$.

In FIG. 3, $\Delta\tau$ 302 denotes the time when the DS estimates the overall channel for each of L consecutive time intervals 302, and $\{P_l, 1 \leq l \leq L\}$ denotes a sequence of amplification matrices used during the corresponding L consecutive time intervals.

The overall channel estimates between the SS and the DS are $$H_{O,l} = H_2 P_l H_1, \ 1 \leq l \leq L. \qquad (2)$$

In the preferred embodiment, L=3.

Construction of Amplification Matrix Sequence $\{P_l, 1 \leq l \leq L\}$

We construct the amplification matrices $\{P_l, 1 \leq l \leq L\}$ such that $T_1 = \alpha I_{N_r}$ and $$T_2 = \frac{1}{\alpha} I_{N_r}$$

are the sole solutions to the following matrix equation group $$P_l = T_2 P_l T_1, \ 1 \leq l \leq L, \qquad (3)$$

i.e., a solution for the matrix group equations have one degree of freedom.

When $P_1 = I_{N_r}$, $T_2 = T_1^{-1}$ and Equation (3) can be rewritten as $$P_l T_1 = T_1 P_l, \ 2 \leq l \leq L. \qquad (4)$$

We define a $(L-1)N_r^2 \times N_r^2$ block matrix as $$B = \begin{bmatrix} I_{N_r} \otimes P_2 & -P_2^T \otimes I_{N_r} \\ I_{N_r} \otimes P_3 & -P_3^T \otimes I_{N_r} \\ & \vdots \\ I_{N_r} \otimes P_L & -P_L^T \otimes I_{N_r} \end{bmatrix}, \qquad (5)$$

where $\otimes$ denotes the well known Kronecker product, which is an operation on two matrices of arbitrary size resulting in a block matrix. The rank of block matrix B is $N_r^2 - 1$.

Equation (5) can be rewritten as $$B \cdot t_1 = 0, \qquad (6)$$

where $t_1 = \text{vec}(T_1)$ denotes a vectorization of $T_1$ formed by stacking the columns of matrix $T_1$ into a single column vector. The sole solution to equation (6), is $T_1 = \alpha I_{N_r}$ when the rank of block matrix B is $N_r^2 - 1$.

Therefore, we set the amplification matrix to $P_1 = I_{N_r}$, and then determine the sequence $\{P_l, 2 \leq l \leq L\}$ such that the rank of the block matrix B is $N_r^2 - 1$.

We define the eigenvector clusters of the amplification matrices $\{P_l, 2 \leq l \leq L\}$ as follows. We perform an eigenvalue decomposition on each amplification matrix to obtain $$P_l = V_l \Lambda_l V_l^{-1}, \ 2 \leq l \leq L, \qquad (7)$$

where $V_l = (v_{l1}, v_{l2}, \ldots, v_{lN_r})$ denotes the eigenvector matrix of amplification matrix $P_l$, and $V_{ln}$ denotes the $n^{th}$ eigenvector of matrix $P_l$. We group the $N_r$ eigenvectors of matrix $P_l$ into K clusters with $n_k$ eigenvectors in the $k^{th}$ cluster $V_{lk}$, for $1 \leq k \leq K$, such that the vector $V_{lk}$ for different intervals l span the same $n_k$-dimensional space $S_k$.

In the case that the matrix $P_l$ has an n-dimensional (n>1) eigenspace corresponding to an n-order (repeated) eigenvalue, n arbitrary eigenvectors are selected from this eigenspace for grouping.

Given the above eigenvector grouping, our invention equivalently sets $P_1 = I_{N_r}$ and designs the sequence $\{P_l, 2 \leq l \leq L\}$ such that a maximum number of their eigenvector clusters is one. The amplification matrix sequences $\{P_l, 1 \leq l \leq L\}$ and $\{R P_l S, 1 \leq l \leq L\}$, where R and S are arbitrary $N_r \times N_r$ invertible matrices, are equivalent. If one of sequence qualifies as an amplification matrix sequence candidate, the other sequence also qualifies.

Our invention provides the following procedure for constructing diagonal or quasi-diagonal amplification matrices, $P_1$, $P_2$, and $P_3$, for interim channel estimation within three time intervals 301. Our diagonal or quasi-diagonal amplification matrices reduce the complexity of the RS.

Procedure

The first amplification matrix is $P_1 = I_{N_r}$;

Randomly generate $N_r$ distinct complex numbers, each with unit magnitude, to obtain the second (diagonal) amplification matrix $P_2$;

Obtain the third amplification matrix $P_3$ by cyclically shifting the columns of the second matrix $P_2$.

Linear Least Square (LS) Estimation of Interim Channels

Under the condition that $N_r = \min\{N_s, N_d\}$, our invention transforms a set of non-linear matrix equation group with respect to $H_1$ and $H_2$ in (2) into a linear equation. Then, the estimate of the matrices $H_1$ and $H_2$ is obtained as the LS solution to this linear equation.

Case I: $N_d \geq N_s = N_r$

In this case, $H_1$ is an $N_r \times N_r$ square matrix, and, according to Equation (2), $$H_2 = H_{O,l} H_1^{-1} P_l^{-1}, 1 \leq l \leq L \quad (8),$$

which, after eliminating $H_2$, can be rewritten as $$A_l^I H_1 - H_1 B_l^I = 0, 2 \leq l \leq L, \quad (9)$$

where $A_l^I = P_1^{-1} P_l$ and $B_l^I = (H_{O,1}{}^H H_{O,1})^{-1} H_{O,1}{}^H H_{O,l}$.

Case II: $N_s \geq N_d = N_r$

In this case, $H_2$ is an $N_r \times N_r$ square matrix, and, according to Equation (2), $$H_1 = P_l^{-1} H_2^{-1} H_{O,l}, 1 \leq l \leq L, \quad (10)$$

which, after eliminating $H_1$, can be rewritten as $$A_l^{II} H_2 - H_2 B_l^{II} = 0, 2 \leq l \leq L, \quad (11)$$

where $A_l^{II} = H_{O,l} H_{O,1}{}^H (H_{O,1} H_{O,1}{}^H)^{-1}$ and $B_l^{II} = P_l P_1^{-1}$.

Thus, the general set of linear matrix equations under the condition that $N_r = \min\{N_s, N_d\}$ is $$A_l H_x - H_x B_l = 0, 2 \leq l \leq L \quad (12)$$

where $$H_x = \begin{cases} H_1 & \text{Case I} \\ H_2 & \text{Case II} \end{cases}, \quad (13)$$

and $$A_l = \begin{cases} P_1^{-1} P_l & \text{Case I} \\ H_{O,l} H_{O,1}^H (H_{O,1} H_{O,1}^H)^{-1} & \text{Case II} \end{cases}, \quad (14)$$

and $$B_l = \begin{cases} (H_{O,1}^H H_{O,1})^{-1} H_{O,1}^H H_{O,l} & \text{Case I} \\ P_l P_1^{-1} & \text{Case II} \end{cases}. \quad (15)$$

We denote $H_{EO,l}$ as an estimate of $H_{O,l}$, $1 \leq l \leq L$. We replace $H_{O,l}$ with $H_{EO,l}$ in Equation (14) and (15), then Equation (12) can be rewritten as the set of equations $$A_l^E H_x - H_x B_l^E + N_l = 0, 2 \leq l \leq L, \quad (16)$$

where $N_l$ denotes a noise matrix due to imperfect overall channel estimation, $$A_l^E = \begin{cases} P_1^{-1} P_l & \text{Case I} \\ H_{EO,l} H_{EO,1}^H (H_{EO,1} H_{EO,1}^H)^{-1} & \text{Case II} \end{cases}, \quad (17)$$

and $$B_l^E = \begin{cases} (H_{EO,1}^H H_{EO,1})^{-1} H_{EO,1}^H H_{EO,l} & \text{Case I} \\ P_l P_1^{-1} & \text{Case II} \end{cases}. \quad (18)$$

The set of equations (16) can be rewritten as $$(I_{N_r} \otimes A_l^E - (B_l^E)^T \otimes I_{n_r}) h_x + n_l = 0, 2 \leq l \leq L, \quad (19)$$

where $h_x = (h_{x1}, h_{x2}, \ldots, h_{xN_r^2})^T$ and $n_l = (n_{l1}, n_{l2}, \ldots, n_{lN_r^2})^T$ denote the vectorization of $H_1$ and $N_l$ formed by stacking the columns of $H_1$ and $N_l$ into a single column vector, respectively. Without loss of generality, the values of $h_x$ normalized to $h_{x1}$, $$h_{x,n} = \frac{h_x}{h_{x1}},$$

is obtained by solving the following linear set of equations, $$C\, h_{x,n} + n = y, \quad (20)$$

where $n = (n_2^T, n_3^T, \ldots, n_L^T, 0)^T$ and $y = [0, 0, \ldots, 0, 1]^T$ are $N_r^2 + 1$-dimensional column vectors, and $$C = \begin{bmatrix} I_{N_r} \otimes A_2^E - (B_2^E)^T \otimes I_{N_r} \\ I_{N_r} \otimes A_3^E - (B_3^E)^T \otimes I_{N_r} \\ \vdots \\ I_{N_r} \otimes A_L^E - (B_L^E)^T \otimes I_{N_r} \\ 1, \quad 0 \quad 0, \quad \cdots, \quad 0 \end{bmatrix} \quad (21)$$

is an $((L-1) N_r^2 + 1) \times N_r^2$ matrix.

Using the least square procedure, the estimate of $h_{x,n}$ is $$\hat{h}_{x,n,LS} = (C^H C)^{-1} C^H y. \quad (22)$$

After one of matrix $H_1$ and $H_2$ is estimated from Equation (22), the other matrix can be estimated based on Equation (8) for Case I, or Equation (10) for Case II.

The Estimation of $H_1$ and $H_2$ When $N_r > \min\{N_s, N_d\}$

When $N_r > \min\{N_s, N_d\}$, our invention partitions the estimation of the interim channels into multiple steps while the estimation for Case I or II, as described above, are applied in each step.

Specifically, when $N_r > \min\{N_s, N_d\}$, we partition the receive and transmit antenna pairs at the RS into multiple groups so that $N_r' = \min\{N_s, N_d\}$ where $N_r'$ denotes the number of antenna pairs in each group. By grouping the receive and transmit antenna pairs at the RS, the original $N_s/N_r/N_d$ two-hop MIMO AF relay network i.e., $N_s$ transmit antennas at the SS, $N_r$ receive and transmit antenna pairs at the RS, and $N_d$ receive antennas at the DS, is partitioned into K parallel $N_s/N_r'/N_d$ subnetworks, where K denotes the number of antenna groups. When transmitting and receiving with the group of antennas, the group of antennas effectively form a subnetwork for which the estimating is done.

To ensure that there are $N_r'$ antenna pairs in each group, and more important, to obtain the amplitude and phase relationship between the interim channels of the different subnetworks, there are overlapping antenna pairs in different groups.

Because $N_r'=\min\{N_s, N_d\}$, the interim channels can be estimated by the estimation process for Case I or II above by only enabling the required receive and transmit antenna pairs of the RS. Afterwards, the overall interim channels are obtained by combining the estimates for interim channels.

An example below describes the interim channels estimation when $N_r > \min\{N_s, N_d\}$. Consider a two-hop MIMO AF relay network with SS antennas $N_s=2$, RS antennas $N_r=4$, and DS antennas $N_d=4$. Because $N_r'=\min\{2,4\}=2$, there are two receive and transmit antenna pairs in each group at the RS.

To obtain the amplitude and phase relationship between the interim channels, the four antenna pairs at the RS, $p_1$, $p_2$, $p_3$, and $p_4$ are partitioned into three groups, e.g., $p_1$ and $p_2$ form Group 1, $p_3$ and $p_4$ form Group 2, and $p_1$ and $p_3$ form Group 3.

Overlapping between different groups is utilized to determine the amplitude and phase relationship between the interim channels of the different subnetworks. Therefore, it is unnecessary that every two groups have overlapping antenna pairs.

The interim channels for each group are estimated as for Case I above, and afterwards the overall interim channels are obtained by combining the estimates for the interim channels appropriately.

Our invention is applicable to the case wherein the RS serves one or multiple DS. For the multi-user case, the RS applies the same amplifying matrix sequence for different MS, and each MS performs the estimation of its interim channels independently.

Figure 4:
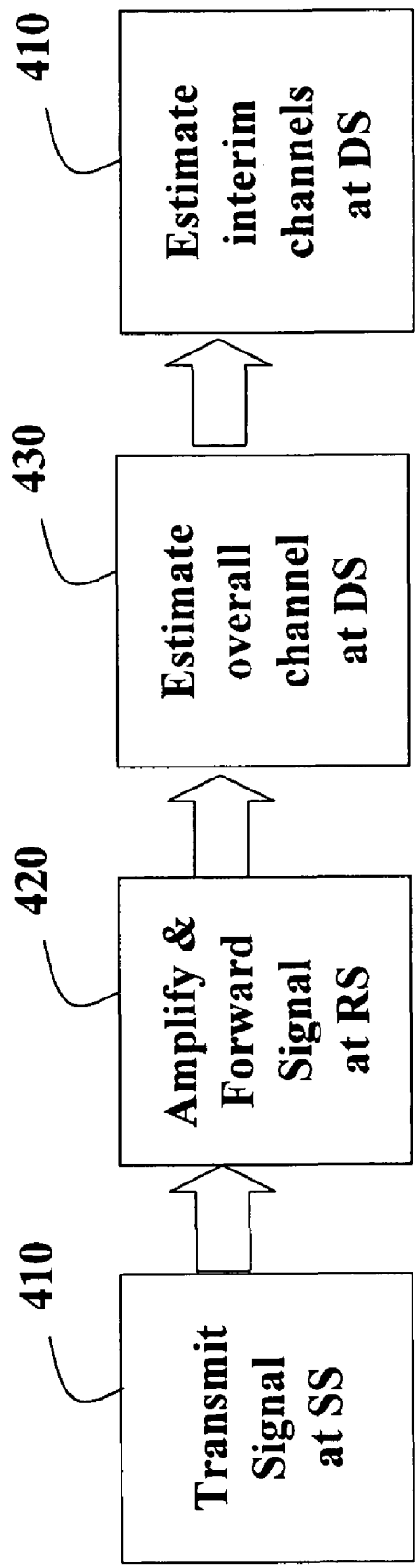
FIG. 4 is a flow diagram of channel estimation according to embodiment of the invention.

FIG. 4 shows the overall method 1 for estimating channels in a two-hop multi-input-multi-output (MIMO) amplify-and-forward (AF) relay network including a source station (SS), a relay station (RS), and a destination station (DS), wherein there is a first interim channel between the SS and the RS, a second interim channel between the RS and the DS, and an overall channel between the SS and DS.

We transmit 410 using the first interim channel, a signal from the SS to the RS. We forward 420 the signal while amplifying and varying a power amplifying matrix during consecutive time intervals. We estimate 430 the overall channel during each time interval a the DS, and then estimate 440 the first interim channel and the second interim channel based on the estimates of the overall channels obtained during the consecutive time intervals.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for estimating channels in a two-hop multi-input-multi-output (MIMO) amplify-and-forward (AF) relay network including a source station (SS), a relay station (RS), and a destination station (DS), wherein there is a first interim channel between the SS and the RS, a second interim channel between the RS and the DS, and an overall channel between the SS and DS, comprising the steps of:
   transmitting, using the first interim channel, a signal from the SS to the RS;
   amplifying, in the RS, the signal, while varying a power amplifying matrix during consecutive time intervals;
   forwarding, using the second interim channel, the amplified signal from the RS to the DS during the consecutive time intervals;
   estimating, in the DS, the overall channel during each time interval;
   estimating the first interim channel and the second interim channel based on the estimates of the overall channels obtained during the consecutive time intervals, and wherein each estimate of the overall channel is in a form of a non-linear equation, and further comprising:
   transforming the non-linear equations to a single linear equation; and
   solving the single linear equation using a low-complexity linear least square estimation process to obtain the estimates of the first and second interim channels.

2. The method of claim 1, further comprising:
   selecting antennas for transmitting signal from the SS to the DS according to the estimates of the first interim channel and the second interim channel.

3. The method of claim 1, wherein pilot signals transmitted by the SS to the RS are only amplified by the RS before retransmitting the amplified pilot signals to the DS.

4. The method of claim 1, wherein an overall channel matrix is $H_O = H_2 P_L H_1$, for $1 \leq l \leq L$, wherein $H_1$ is a channel matrix for the first interim channel, $H_2$ is a the channel matrix for the second interim channel, and $P_L$ is the power amplifying matrix.

5. The method of claim 4, wherein L=3.

6. The method of claim 1, wherein a first amplification matrix is $P_1 = I_{N_r}$, wherein I is an identity matrix, and $N_r$ is a number of antennas at the RS, and further comprising:
   generating randomly $N_r$ complex numbers, each with unit magnitude to obtain a second power amplification matrix $P_2$; an
   shifting cyclically columns of the second matrix $P_2$ to obtain a the third amplification matrix $P_3$.

7. The method of claim 1, wherein receive and transmit antennas at the RS are partitioned into multiple groups, and the estimating steps are performed for each group.

8. The method of claim 7, wherein the number of the receive and transmit antennas in each group equals the smaller one of the number of antennas at the SS and the number of antennas at the DS.

9. The method of claim 7, wherein there are overlapping receive and transmit antenna pairs in the different groups.

10. The method of claim 7 wherein each group of antennas forms a subnetwork, and antennas, and the receive and transmit antennas at the RS that are outside the subnetwork are switched off.

11. The method of claim 7, wherein each group includes a pair of antennas.

12. The method of claim 1, wherein, when estimating steps are performed periodically.

13. The method of claim 1, wherein, a solution for the single linear equation has one degree of freedom.

14. The method of claim 10, wherein during the estimating of the interim channels of each subnetwork, the overall channels of this subnetworks involving different amplifying matrices of the RS are obtained at the DS or the SS.

* * * * *